P. E. BECKER.
ADJUSTABLE THREAD CUTTING TOOL.
APPLICATION FILED APR. 19, 1911.

1,114,720.

Patented Oct. 27, 1914.

2 SHEETS—SHEET 1.

P. E. BECKER.
ADJUSTABLE THREAD CUTTING TOOL.
APPLICATION FILED APR. 19, 1911.
1,114,720.
Patented Oct. 27, 1914.
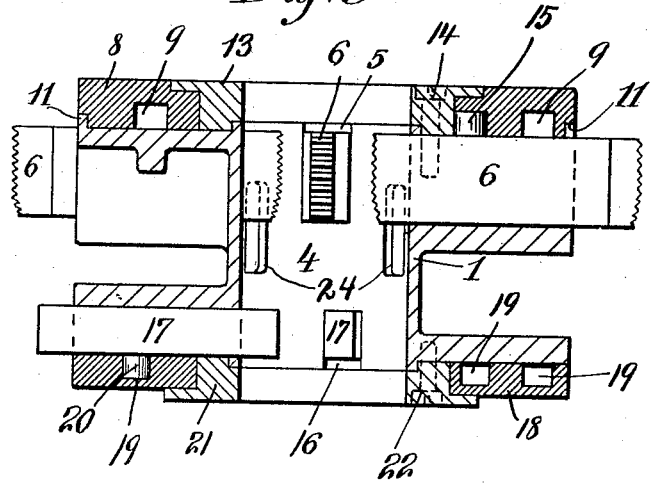
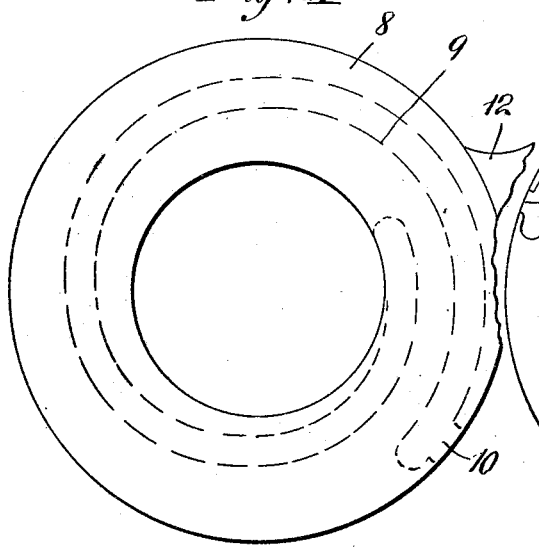
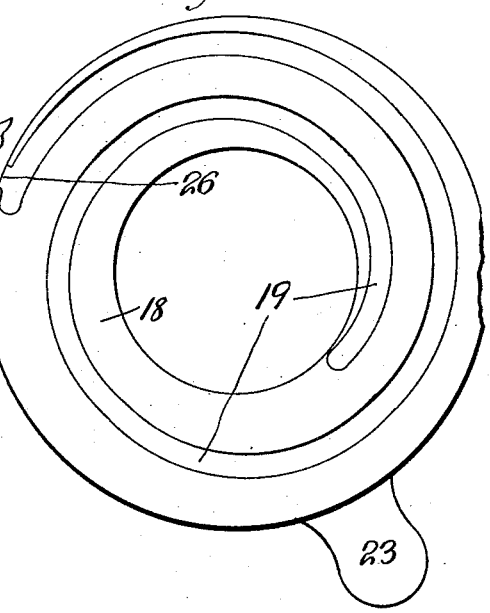
Witnesses:
Inventor
Paul E. Becker,
By his Attorneys
Edwards, Sager & Wooster

UNITED STATES PATENT OFFICE.

PAUL ERDMAN BECKER, OF BRIDGEPORT, CONNECTICUT, ASSIGNOR TO THE CONNECTICUT TOOL COMPANY, OF BRIDGEPORT, CONNECTICUT, A CORPORATION OF CONNECTICUT.

ADJUSTABLE THREAD-CUTTING TOOL.

1,114,720.  Specification of Letters Patent.  Patented Oct. 27, 1914.

Application filed April 19, 1911. Serial No. 621,991.

*To all whom it may concern:*

Be it known that I, PAUL E. BECKER, a citizen of the United States, residing at Bridgeport, in the county of Fairfield and State of Connecticut, have invented certain new and useful Improvements in Adjustable Thread-Cutting Tools, of which the following is a full, clear, and exact specification.
This invention relates to adjustable thread cutting tools, and more particularly has reference to improvements in the mechanical construction and arrangement of parts whereby the use of clamping screws for holding chasers and guides while cutting is avoided, and also whereby the chasers and guides may be reversed and thereby a wider range of threading diameters secured than is possible by the adjustment of cams.
In the particular embodiment of the invention herein shown, the body or shank is generally cylindrical in shape being provided with handles for turning, and also with sets of adjustable chasers and guide bars. In order to expand and contract the chasers and hold them without necessitating screws, there is provided a single plate having a scroll cam somewhat approaching the involute of a circle, and the chasers are operatively engaged with this scroll plate to be movable in and out as the scroll plate is revolved. By reason of the chasers all being engaged by a single scroll plate, they are made in sets and engaged in predetermined order so as to be equidistant from the center.

The particular feature of this invention comprises double ended chasers which, when operating at one end, will cut threads of certain diameters according to the position of the scroll plates, but when reversed they will cut a different set of diameters, which latter diameters may be greater than the normal throw of the cam. Thereby, die mechanism is provided having a wider range of diameters for a given size without increasing the number of parts or cost of manufacture. Also, the same principle is applied to the guide bars for guiding and steadying the work, which are operated by a separate scroll plate requiring no clamps to hold them in adjusted position.

Figure 1:
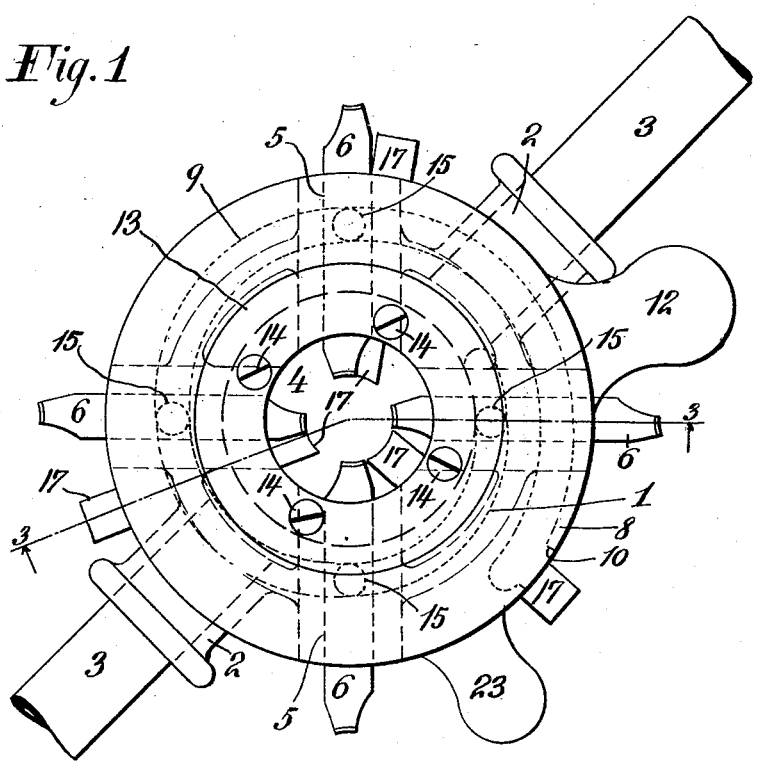
Figure 2:
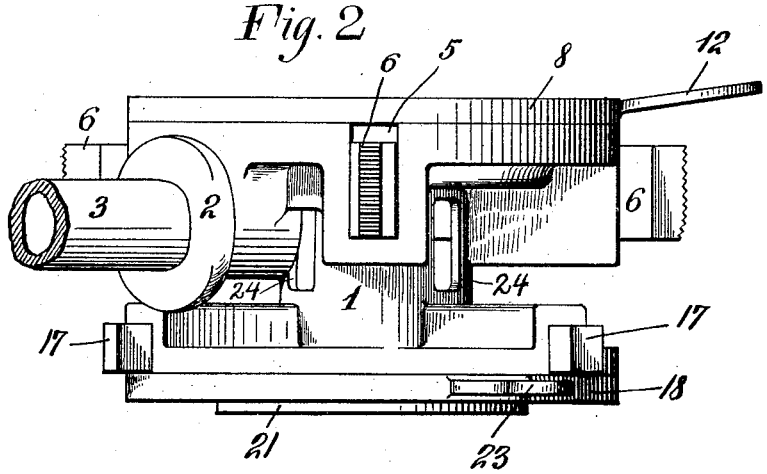

The invention will be more fully understood in connection with the description of the accompanying drawings, in which—
Figure 1 is a top plan view of a die stock embodying the invention; Fig. 2 is a side elevation; Fig. 3 is a vertical section; and Figs. 4 and 5 are views of the scroll plates for the chasers and guides, respectively.

1 represents a generally cylindrical body having cylindrical projections 2 into which operating handles 3 are screwed, and also having the central hole 4 to receive the rod or pipe to be threaded. The upper flat face of the body portion 1 is provided with radial slots 5, in which chasers 6 will be mounted, these chasers having thread cutting teeth at each end. In order to operate the chasers, there is mounted on the top of the body 1 a rotatable scroll plate 8, having a continuous slot 9 therein with an intermediate opening 10 from the outside of the plate. The scroll plate 8 is journaled on the top of the body 1 partly overhanging the shoulder 11 so as to keep chips out, and at the center is fastened by a ring 13 and screws 14.

12 is a handle for turning the plate 8.

The chasers are provided with pins 15 which engage directly in the slots 9, the pins 15 being at different distances from the cutting end of each chaser, these distances being predetermined according to the pitch of the scroll so that the chasers are threaded into the slots 9 at the point 10 one after another. As the scroll plate 8 is revolved opposite each chaser to permit it to be inserted, the cutting ends will all come equally distant from the center. When the last chaser has been inserted, the scroll plate has made about ¾ of a revolution. It will be seen that the ring 13 bears directly on the top of the chaser adjacent the cutting edge, while the bottom of the chaser has a long bearing at the bottom of the slot 5 on the body 1. Thus there is no tendency of the chasers to tilt under the cutting strain. Each end of the chaser is made to form a cutting edge, and as these chasers are in sets and the pins at predetermined distances from the chaser ends, a different set of diameters can be cut with the different ends of the chasers, thus practically doubling the capacity of the die.

24 are holes in the body 1 to permit escape of chips, and also the work to be oiled.

The bottom of the body 1 is provided with radial slots 16 in which guide bars 17 are mounted to slide in and out in the same manner, by a scroll plate 18 having a scroll slot 19 to engage pins 20 in the guide bars 17. The scroll plate 18 is fastened to the body by a ring 21 and screws 22, and handle 23 may be provided for turning plate 18. It will be observed that four chasers are provided, while three guide bars are provided, this being because it has been found in practice that more accurate work is produced by four chasers than by three, while in the work of guiding, three guide bars are satisfactory, although it will be understood that more guide bars could be used if desirable. The guide bars 17 may be inserted in the scroll slot 19 in the same manner as are the chasers 6 in the scroll slot 9.

It will be observed that the body 1 has shoulders at top and bottom, which fit correspondingly shaped recesses in the rings 13, 21, which shoulders not only center the rings and scroll plates, but form closed contact surfaces which prevent entrance of chips, dirt or the like between the parts of the mechanism. The openings 10, 26, for inserting the chasers and guide bars respectively in scroll plates 8, 18, are intermediate the ends of scroll slots 9, 19, and thereby the scroll plates can be turned until the pins strike the ends of the slots without falling out. By reason of the very slight angle the pins make with the sides of the scroll slots, no clamps are necessary and the chasers will remain in accurate adjusted position during use, the friction holding the parts when once the strain is applied.

From the foregoing description it will be seen that I have provided an adjustable thread cutting tool wherein the use of clamps for holding the chasers during the cutting is done away with, and at the same time reversible chasers provide a wide range of cutting diameters. Furthermore, it will be seen that I have provided a simple and strong construction, in which all of the parts will be readily accessible; the wearing parts protected from chips, and capable of being easily renewed.

Having thus described my invention, I declare that what I claim as new and desire to secure by Letters Patent, is—

1. The combination with a body having radial guide ways, of radially movable chasers sliding in said guide ways and having engaging means at respectively different and unequal distances from the ends, said chasers having cutting teeth at both ends, and a rotatable plate having a scroll slot of uniform curvature engaging said chasers in predetermined order and for moving them radially when rotated, said slot coöperating with said chasers for operating them radially within certain limits of diameters for one position and predetermined order thereof, and within certain other limits of diameters for the other position and predetermined order thereof, relatively to a common center.

2. The combination with a body having radial guide ways, of radially movable chasers sliding in said guide ways and having engaging means at respectively different and unequal distances from the ends, said chasers having cutting teeth at both ends, and a rotatable plate having a scroll slot of uniform curvature engaging said chasers in predetermined order and for moving them radially when rotated, said slot having an intermediate radial insertion opening and coöperating with said chasers for operating them radially within certain limits of diameters for one position and predetermined order thereof, and within certain other limits of diameters for the other position and predetermined order thereof, relatively to a common center.

3. The combination in an adjustable thread cutting tool with a body having a central opening and transverse radial guideways, of radial chasers sliding in said guideways, and a plate having a continuous scroll slot of uniform curvature, said engaging means being disposed on said chasers to bring the inner ends of said chasers when arranged in predetermined order centrally within said central opening, said slot having a transverse opening from the exterior of the body for inserting or withdrawing said chasers disposed at a point intermediate the ends of said slot.

In testimony whereof I affix my signature, in presence of two witnesses.

PAUL ERDMAN BECKER.

Witnesses:
 ALFRED GRIESINGER,
 CHARLES BECK.

---

Copies of this patent may be obtained for five cents each, by addressing the "Commissioner of Patents, Washington, D. C."